United States Patent
Sakaguchi

(10) Patent No.: US 8,610,385 B2
(45) Date of Patent: Dec. 17, 2013

(54) MOTOR DRIVING CIRCUIT

(75) Inventor: Takahiro Sakaguchi, Nagano (JP)

(73) Assignee: Minebea Co., Ltd., Nagano (JP)

( * ) Notice: Subject to any disclaimer, the term of this patent is extended or adjusted under 35 U.S.C. 154(b) by 53 days.

(21) Appl. No.: 13/372,746

(22) Filed: Feb. 14, 2012

(65) Prior Publication Data

US 2012/0217907 A1    Aug. 30, 2012

(30) Foreign Application Priority Data

Feb. 28, 2011    (JP) .................................. 2011-042305

(51) Int. Cl.
*H02P 6/00*    (2006.01)

(52) U.S. Cl.
USPC .............. 318/400.1; 318/400.26; 318/400.35; 318/721; 318/400.13

(58) Field of Classification Search
USPC ........................................ 318/400.01, 400.04
See application file for complete search history.

(56) References Cited

U.S. PATENT DOCUMENTS

| | | | |
|---|---|---|---|
| 4,499,408 A * | 2/1985 | Bitting et al. | 318/400.04 |
| 6,051,942 A * | 4/2000 | French | 318/254.1 |
| 2004/0075407 A1 | 4/2004 | Ohiwa et al. | |
| 2008/0048598 A1 * | 2/2008 | Shibuya | 318/400.1 |
| 2011/0181214 A1 * | 7/2011 | Nakahata et al. | 318/400.04 |

FOREIGN PATENT DOCUMENTS

JP    2004-140897 A    5/2004

* cited by examiner

*Primary Examiner* — Eduardo Colon Santana
*Assistant Examiner* — Bickey Dhakal
(74) *Attorney, Agent, or Firm* — Carrier Blackman & Associates, P.C.; William D. Blackman; Michael J. McCandlish

(57) ABSTRACT

A motor driving circuit includes an inverter circuit which supplies a driving current to a coil of a single phase brushless DC motor, a position detection sensor which detects a magnetic pole position of a magnet rotor of the motor and outputs a position detection signal, and a controller which controls the inverter circuit based on the position detection signal and a speed instruction signal for instructing a rotating speed of the motor. At a time of startup of the motor, the controller makes a pulse width of a PWM signal for controlling the inverter circuit constant in a first time period which starts after the position detection signal zero-crosses and lasts until the position detection signal zero-crosses next time, and narrows the pulse width of the PWM signal as time elapses in a second time period immediately after the first time period.

6 Claims, 4 Drawing Sheets

T2 : THIRD TIME PERIOD
T3 : FIRST TIME PERIOD
T4 : SECOND TIME PERIOD

_

MOTOR DRIVING CIRCUIT

BACKGROUND OF THE INVENTION

1. Field of the Invention

The present invention relates to a motor driving circuit which drives a single phase brushless DC motor.

2. Description of the Related Art

A motor driving method has been suggested which amplifies an output voltage signal (hereinafter, referred to as Hall signal) of a Hall device provided to a single phase brushless DC motor and applies the same to a motor coil (for example, refer to JP 2004-140897A).

When generating a driving signal for driving a motor coil based on a Hall signal having a sinusoidal wave form, a waveform of the driving signal is distorted due to distortion of a magnetic flux which the Hall device detects in the vicinity of zero cross, so that rotation becomes unstable or vibration or noise is generated.

In order to solve the this problem, when performing a soft switching operation by a PWM signal for generating the driving signal based on a voltage amplitude of the Hall signal at the time of startup of the motor, a variety of problems may occur due to the voltage amplitude of the Hall signal when performing the soft switching operation. That is, when the voltage amplitude of the Hall signal is large, a back electromotive voltage or noise is generated due to shortness of soft switching time, and when the voltage amplitude is small, the soft switching time is long, so that rotating speed is decreased.

SUMMARY OF THE INVENTION

The present invention has been made to solve the above problems. Accordingly, an object of the present invention is to provide a motor driving circuit realizing stable rotation at the time of startup of a single phase brushless DC motor and capable of suppressing generation of a back electromotive voltage and noise.

According to an illustrative embodiment of the present invention, there is provided a motor driving circuit comprising: an inverter circuit which supplies a driving current to a coil of a single phase brushless DC motor; a position detection sensor which detects a magnetic pole position of a magnet rotor of the single phase brushless DC motor and outputs a position detection signal; and a controller which controls the inverter circuit based on the position detection signal and a speed instruction signal which is supplied from an outside for instructing a rotating speed of the single phase brushless DC motor. At a time of startup of the single phase brushless DC motor, the controller makes a pulse width of a PWM signal for controlling the inverter circuit constant in a first time period which starts after the position detection signal zero-crosses and lasts until the position detection signal zero-crosses next time, and narrows the pulse width of the PWM signal as time elapses in a second time period immediately after the first time period.

According to the above configuration, the number of rotations becomes stable at the time of startup of the single phase brushless DC motor and generations of the back electromotive voltage and noise can be suppressed.

DETAILED DESCRIPTION

Hereinafter, illustrative embodiments of the present invention will be described with reference to the drawings.

Figure 1:
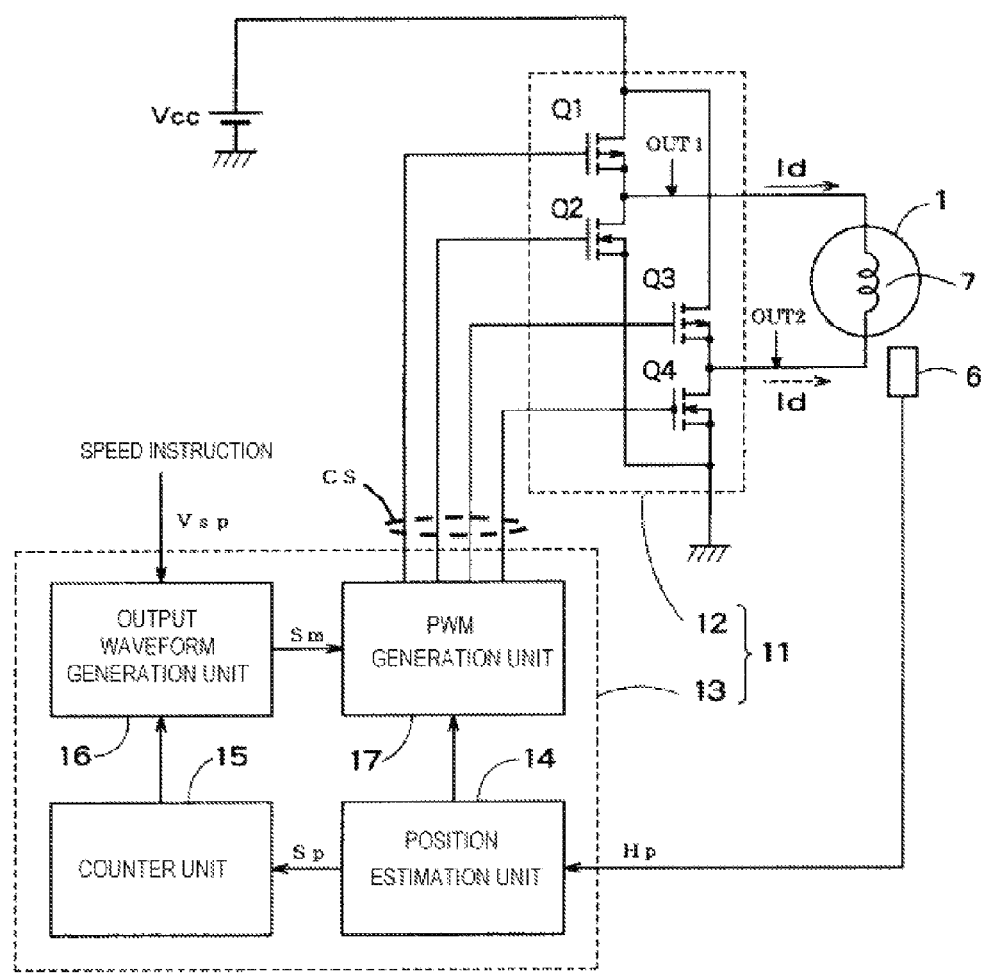
FIG. 1 is a block diagram showing a schematic configuration of a motor driving circuit 11 according to an illustrative embodiment of the present invention.
Figure 2:
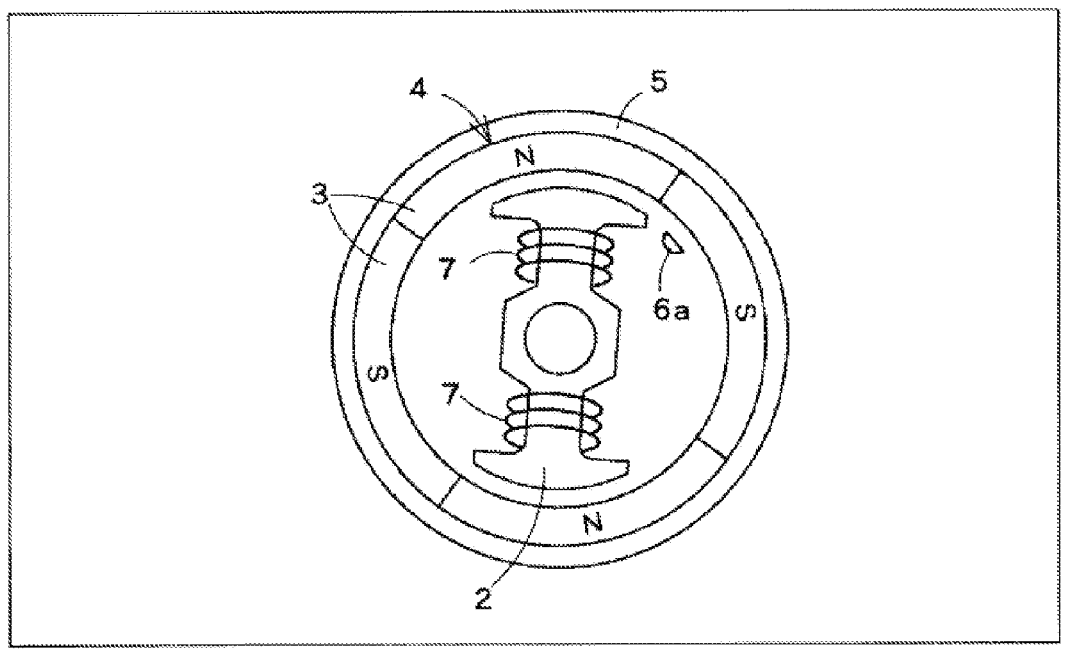
FIG. 2 shows an exemplary configuration of a single phase brushless DC motor 1.

FIG. 1 is a block diagram showing a schematic configuration of a motor driving circuit 11 according to an illustrative embodiment of the present invention, and FIG. 2 shows an exemplary configuration of a single phase brushless DC motor 1. As shown in FIG. 2, the single phase brushless DC motor (hereinafter, referred to as motor) 1 is configured such that a magnet rotor 4 having four magnetic poles 3 is arranged around a stator core 2. The magnet rotor 4 is configured to be rotated about a central shaft. All of the four magnetic poles 4 are permanent magnets and magnetization directions thereof are aligned in a radial direction from the central shaft. A magnetic yoke 5 is arranged at an outer periphery of the magnet rotor 4. However, the magnetic yoke 5 may be omitted.

A rotating position detection circuit 6 is provided in the vicinity of an inner periphery of the magnet rotor 4. Although not specifically shown, the rotating position detection circuit 6 has a position detection sensor (Hall device) 6a which detects a starting position of the magnet rotor 4 of the motor 1 and a differential amplifier which differentially amplifies a signal detected by the position detection sensor 6a. The rotating position detection circuit 6 generates a position detection signal Hp, based on a detection result of the position detection sensor 6a.

The stator core 2 is wound with coils 7. By controlling a direction of current flowing in the coils 7, a rotating direction of the magnet rotor 4 can be switched.

The motor driving circuit 11 of FIG. 1 has an inverter circuit 12 which supplies driving current to the coils 7 and a controller 13 which controls the inverter circuit 12.

The inverter circuit 12 has transistors Q1, Q2 connected in series between a power supply terminal Vcc and a ground terminal and transistors Q3, Q4 connected in series between the power supply terminal Vcc and the ground terminal That is, the transistors Q1, Q2 are connected in parallel with the transistors Q3, Q4.

An intermediate node of the transistors Q1, Q2 is connected to one of the coil 7 and an intermediate node of the transistors Q3, Q4 is connected to the other of the coil 7. The transistors Q1, Q4 turn on/off in the same direction at the same timing and the transistors Q2, Q3 turn on/off in the same direction at the same timing. Specifically, when the transistors Q1, Q4 turn on, the transistors Q2, Q3 turn off. At this time, current Id flows in a direction shown with a solid arrow of FIG. 1. Also, when the transistors Q1, Q4 turn off, the transistors Q2, Q3 turn on. At this time, the current Id flows in a direction shown with a broken line arrow of FIG. 1.

Accordingly, the inverter circuit 12 switches the direction of the current flowing in the coil 7, depending on whether the magnetic poles 3 of the magnet rotor 4 facing the stator core 2 are N or S poles, thereby rotating the magnet rotor 4 in the same direction.

The controller 13 has a position estimation unit 14, a counter unit 15, an output waveform generation unit 16 and a PWM generation unit 17.

When the motor 1 drives under steady state, the position estimation unit 14 generates a position signal Sp whose phase is determined based on an average time obtained by dividing a time interval, during which the magnet rotor 4 rotated one rotation in the last time, by the number of magnetic poles of the motor 1. The position signal Sp at the steady state is a sinusoidal wave. At a startup of the motor 1, the position estimation unit 14 generates a position signal Sp having a rectangular waveform synchronous with a position detection signal Hp.

The position estimation unit 14 is provided because a period of the position detection signal Hp, which is detected by the rotating position detection circuit 6, varies due to noises in the vicinity of a zero cross of the position detection signal Hp or deviation of flux content of the magnet rotor 4. At the time of steady state, the position estimation unit 14 performs averaging processing, thereby generating the position signal Sp in which the variation of the period is suppressed.

The position signal Sp at the time of steady state is a signal in which the average time T/N, which is obtained by dividing the time interval T during which the magnet rotor 4 rotates one rotation by the number of magnetic poles N of the motor 1, corresponds to a 180° phase that is an electric angle of the motor 1. Also, the position signal Sp at the time of startup is a signal having a rectangular waveform with the same frequency and phase as the position detection signal Hp, which zero-crosses at the same time as the position detection signal Hp does.

The counter unit 15 counts a time interval between the zero cross points of the position signal Sp at the time of steady state at a predetermined period and outputs a count value corresponding to the time of one rotation of the magnet rotor 4. At the time of startup of the motor 1, the counter unit 15 performs the count operation, starting from the zero cross point of the position signal Sp, as described below.

The output waveform generation unit 16 generates a modulation signal Sm synchronous with the position signal Sp, based on a speed instruction signal Vsp supplied from the outside and the count value. The PWM generation unit 17 converts the modulation signal Sm into a PWM signal CS for controlling the inverter circuit 12.

Figure 3:
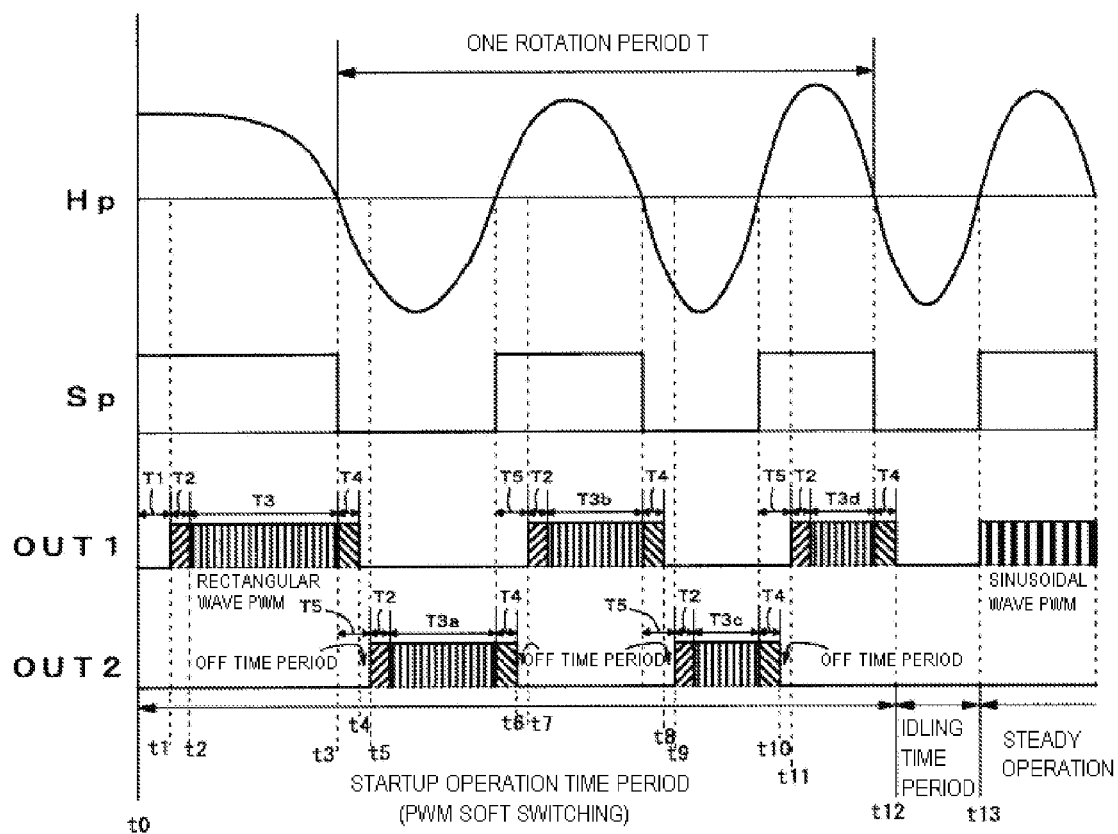
FIG. 3 shows signal waveforms of a position detection signal Hp, a position signal Sp and an output signal of an inverter circuit 12 at the time of startup of the motor 1.

FIG. 3 shows signal waveforms of the position detection signal Hp, the position signal Sp and the output signal of the inverter circuit 12 at the time of startup of the motor 1. In the below, the soft switching operation at the time of startup of the motor 1 is described with reference to FIGS. 1 and 3.

In this illustrative embodiment, at the time of startup of the motor 1, pulse widths of output signals OUT1, OUT2 of the inverter circuit 12 are controlled every cycle when the position detection signal Hp detects the zero cross. More specifically, for each cycle, the respective output signals OUT1, OUT2 are provided with a time period T2 in which the pulse width is increased as time elapses, a time period T3 in which the pulse width is constant and a time period T4 in which the pulse width is decreased as time elapses. It is noted that the output signals OUT1, OUT2 in the time periods T2 to T4 are PWM signals having rectangular waves synchronous with the PWM signal CS generated in the PWM generation unit 17.

In FIG. 3, time t0 is start time of the startup of the motor 1. From time t0 to predetermined time period T1, a driving voltage is not applied to the coil 7. Since the power supply voltage is not stable in the time period T1, the driving current is not allowed to flow to the coil 7.

Figure 4:
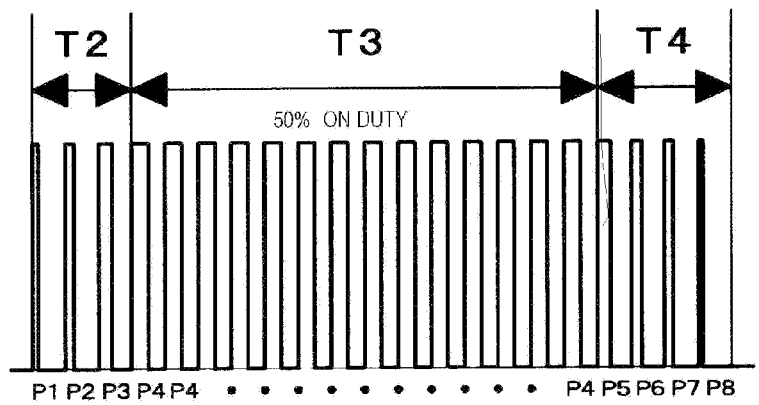
FIG. 4 is an enlarged view of an example of an output signal OUT1.

In a time period T2 (third time period) from time t1 to time t2 after the predetermined time period T1, the controller 13 widens the pulse widths of the output signals OUT1, OUT2 of the inverter circuit 12 as time elapses. FIG. 4 is an enlarged view showing an example of the output signal OUT1. As shown in FIG. 4, in the time period T2, the pulse width of the output signal OUT1 is gradually widened as time elapses, so that the driving current flowing in the coil 7 is also gradually increased. Therefore, there is no concern that the startup current rapidly flows in the coil 7. In the meantime, the output signal OUT2 has the same waveform as FIG. 4 although a cycle is shifted.

At time t2 after the time period T2, in a time period T3 (first time period) from time t2 to time t3, the controller 13 generates the PWM signal CS having a same voltage amplitude with a constant pulse width. Thereby, in the time period T3 shown in FIG. 4, the output signal OUT1 of the inverter circuit 12, which is applied to one of the coil 7, becomes a PWM signal which has a pulse width of 50% on-duty and a constant voltage amplitude. Therefore, the driving current flows in the coil 7 with the substantially same period.

At time t3 after the time period T3, in a time period T4 (second time period) from time t3 to time t4, the controller 13 narrows the pulse widths of the output signals OUT1, OUT2 of the inverter circuit 12 as time elapses. Thereby, the voltage waveform of the output signal OUT1 becomes a waveform as shown from time t3 to time t4 of FIG. 3. More specifically, as shown in FIG. 4, in the time period T4, the pulse width of the output signal OUT1 is gradually narrowed, the fourth pulse signal is the last and a pulse signal does not appear thereafter. Thereby, the driving current flowing in the coil 7 is gradually decreased. Therefore, the situation that the back electromotive voltage is rapidly generated in the coil 7 can be avoided.

A time period from time t4 to time t5 after the time period T4 is an off time period during which the driving current is not allowed to flow in the coil 7. That is, a time period T5 (fourth time period) (=second time period T4+off time period) from time t3 to time t5, which starts from each zero cross point of the position detection signal Hp, is a time period during which the output signal OUT2 is not output. The fourth time period may also be referred to as a transition time period herein. Thereafter, in a time period from time t5 to time t6, a voltage waveform of the output signal OUT2 of the inverter circuit 12 is the same as the voltage waveform of the time periods of T2 to T4 shown in FIG. 4.

Then, in time periods from time t7 to time t8 and from time t11 to time t12 with the off time periods being intervened therebetween, the output signal OUT1 of the inverter circuit 12 has the similar voltage waveform to that in the time periods of T2 to T4, and in a time period from time t9 to time t10, the output signal OUT2 has the similar voltage waveform to that in the time periods of T2 to T4. In the meantime, the second time period T4, the third time period T2 and the fourth time period T5 have the same length in each cycle between the zero cross points of the position detection signal Hp, and the first time periods T3, T3a, T3b, T3c, T3d have the lengths that are adjusted in response to time variations between the respective zero cross points of the position detection signal Hp. In other words, the first time periods T3, T3a, T3b, T3c, T3d have the lengths which are obtained by subtracting the respective lengths of the third time period T2 and fourth time period T5 from the lengths between the respective zero cross points.

At time t12, the rotation of the motor becomes stable and the motor can thus drive under steady state. Therefore, the driving voltage is not applied to the coil 7 in a time period from time t12 to time t13, which is an idling time period. By providing the idling time period, the motor 1 can be surely driven in the steady state from the zero cross point of the next position detection signal Hp.

After time t13, the time period is a steady driving time period, and the position signal Sp is estimated by using a length, which is obtained by averaging the plurality of periods of the position detection signals Hp detected by the rotating position detection circuit 6. Then, the counter unit 15 measures a count value corresponding to the time of one rotation of the magnet rotor 4 by counting the time interval between zero cross points of the position signal Sp, and the output waveform generation unit 16 determines the phase and period of the modulation signal Sm by the count value. Thereby, even when the period or amplitude of the position detection signal Hp detected by the position detection signal 6a varies, the modulation signal Sm can be generated with good precision without being affected by the variation and thus to stably rotate the motor 1.

In the below, the method of generating the output signals OUT1, OUT2 of the inverter circuit 12 at the time of startup of the motor 1 is more specifically described. As shown in FIGS. 3 and 4, the output signals OUT1, OUT2 include the time period T2 during which the pulse width is widened as time elapses, the time period T3 during which the pulse width is constant and the time period T4 during which the pulse width is narrowed as time elapses. The output signals OUT1, OUT2 are alternately output with the off time period being intervened therebetween each time the position detection signal Hp zero-crosses.

The output signals OUT1, OUT2 are signals synchronous with the PWM signal CS generated from the PWM generation unit 17. The PWM signal CS is a signal synchronous with the modulation signal Sm generated from the output waveform generation unit 16. Accordingly, the output signals OUT1, OUT2 are signals that are changed according to the signal waveform of the modulation signal Sm. The modulation signal Sm is generated based on the count value counted by the counter unit 15 and the speed instruction signal Vsp supplied from the outside.

Figure 5:
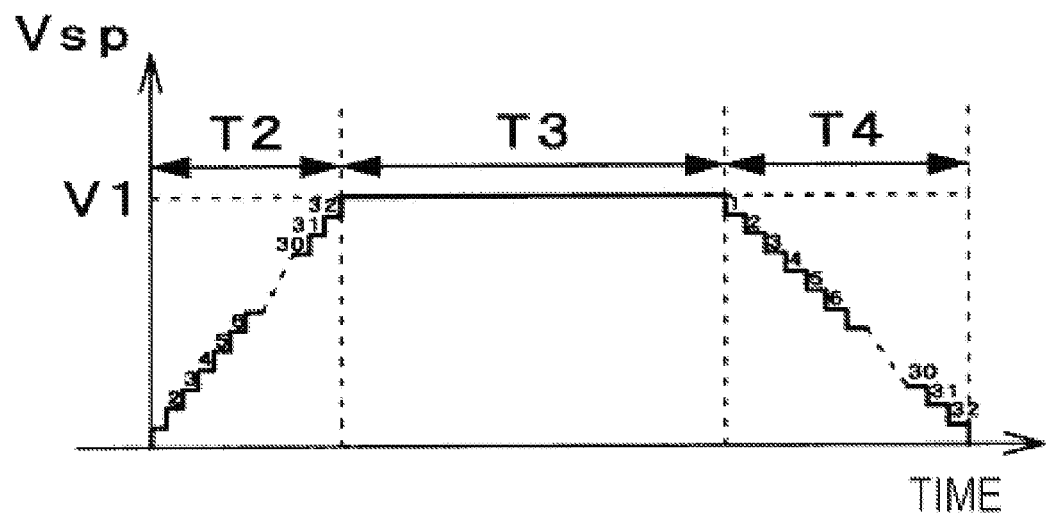
FIG. 5 shows an example of a signal waveform of a modulation signal Sm.

FIG. 5 shows an example of the signal waveform of the modulation signal Sm. As shown, the modulation signal Sm has a time period T2 during which the voltage amplitude is increased in a stepwise manner as time elapse, a time period T3 during which the voltage amplitude is constant and a time period T4 during which the voltage amplitude is decreased in a stepwise manner as time elapses. The respective lengths of the time periods T2 to T4 of the modulation signal Sm are the same as the respective lengths of the time periods T2 to T4 of the output signals OUT1, OUT2 of the inverter circuit 12.

In generating the modulation signal Sm, the output waveform generation unit 16 starts the time period T2 when it is detected by the count value of the counter unit 15 that the predetermined off time period T1 (standby time period) has elapsed from power-on time t0. During the time period T2, the voltage amplitude of the modulation signal Sm is increased in a stepwise manner, as shown in the time period T2 of FIG. 5.

Then, when it is detected by the count value of the counter unit 15 that the time period T2 has elapsed, the output waveform generation unit 16 ends the time period T2 and starts the time period T3. During the time period T3, the output waveform generation unit 16 makes the voltage amplitude of the modulation signal Sm constant, as shown in the time period T3 of FIG. 5.

Then, when the time which the position signal Sp zero-crosses (for example, the time t3 of FIG. 3 and the like) is detected, the output waveform generation unit 16 ends the time period T3 and starts the time period T4. During the time period T4, the output waveform generation unit 16 decreases the voltage amplitude of the modulation signal Sm in a stepwise manner, as shown in the time period T4 of FIG. 5.

Then, when it is detected by the count value of the counter value 15 that the time period T4 has elapsed, the output waveform generation unit 16 ends the time period T4. By the above operations, the signal waveform of the modulation signal Sm shown in FIG. 5 is generated.

That is, at the time of startup of the motor 1, the counter unit 15 starts the count operation from the time at which the position signal Sp zero-crosses. The output waveform generation unit 16 detects the time at which the time period T2 has elapsed, the time at which the time period T3 has elapsed, and the time at which the time period T4 has elapsed by the count value of the counter unit 15, thereby generating the modulation signal Sm shown in FIG. 5.

The output waveform generation unit 16 determines the lengths of the time periods T2 to T4 by the count values of the counter unit 15, respectively. However, at the time of startup of the motor 1, it is not necessary to finely control the lengths of the time periods T2 to T4 by the various conditions and the lengths of the time periods T2 to T4 may be preset. When the time periods T2 and T4 are set, the time period T3 is determined naturally.

As shown in FIG. 3, the time period T4 during which the pulse width of one (for example, output signal OUT1) of the output signals OUT1, OUT2 of the inverter circuit 12 is decreased is shorter than the time period T5 which lasts until the time period T2 of the other output signal (for example, output signal OUT2) starts. Therefore, the off time period (T5−T4) is always provided until the time period T2 starts after the time period T4 ends. By providing the off time period, the transistor pairs Q1, Q4 and Q2, Q3, which alternately turn on/off in the inverter circuit 12, can be prevented from turning on at the same time.

In the meantime, it is not necessarily required to provide the modulation signal Sm with the time period T2. But for the time period T2, at the time of startup of the motor 1, the startup current at the time when the driving current starts to flow in the coil 7 can not be suppressed. However, since the generation of the back electromotive voltage can be suppressed in the time period T4, immediately after the driving current of the coil 7 stops, like FIG. 3, the time periods T3 and T4 may be provided without the time period T2 when the back electromotive voltage is highly problematic. In this case, when it is detected by the count value of the counter unit 15 that the time period (T2+T5) has elapsed from the zero cross point of the position signal Sp, the output waveform generation unit 16 generates the modulation signal Sm having the voltage amplitude that is constant in the time period T3 of FIG. 5 and then continues to generate the modulation signal Sm having the voltage amplitude that is gradually decreased in the time period T4.

That is, in this illustrative embodiment, regarding the soft switching operation at the time of startup of the motor 1, the time period T4 during which the driving voltage having the pulse width decreased as time elapses is applied is provided immediately after the time period T3 during which the pulse-shaped driving voltage having the constant duty ratio is applied to the coil 7. Therefore, the back electromotive voltage can be surely prevented from being generated in the coil 7, to reduce the noise and also to suppress the vibrations.

Also, when the time period T2 during which the driving voltage having the pulse width widened as time elapses is applied is provided immediately before the time period T2, at the time of startup of the motor 1, the driving current can be suppressed from being rapidly increased.

In the above illustrative embodiment, the position detection sensor 6a in the rotating position detection circuit 6 is not limited to the Hall device. For example, the other semiconductor devices such as Hall IC and photo sensor may be also employed.

In FIG. 4, the output signals OUT1, OUT2 of the inverter circuit 12 are the pulse signals having 50% on-duty during the time period T3. However, this is just exemplary. That is, the duty ratio may be appropriately set to be optimal, as required.

The voltage amplitudes of the modulation signal Sm shown in FIG. 5 are changed in a stepwise manner in the time periods T2 and T4. However, the method of generating the modulation signal Sm is not particularly limited. Also, the voltage amplitude may not be changed with the same voltage level and may be arbitrarily changed over several steps.

In the inverter circuit 12 of FIG. 1, the PMOS transistor and the NMOS transistor are connected in series. However, two transistors having the same conductive type may be connected in series.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A motor driving circuit comprising:
    an inverter circuit which supplies a driving current to a coil of a single phase brushless DC motor;
    a position detection sensor which detects a magnetic pole position of a magnet rotor of the single phase brushless DC motor and outputs a position detection signal; and
    a controller which controls the inverter circuit based on the position detection signal and a speed instruction signal which is supplied from an external source for instructing a rotating speed of the single phase brushless DC motor,
    wherein at a time of startup of the single phase brushless DC motor, the controller
    makes a pulse width of a PWM signal for controlling the inverter circuit constant in a first time period which starts after the position detection signal zero-crosses and lasts until the position detection signal zero-crosses next time, and
    narrows the pulse width of the PWM signal as time elapses in a second time period immediately after the first time period, and
    wherein the controller comprises:
        a position estimation unit which generates a position signal synchronous with the position detection signal, at the time of startup of the single phase brushless DC motor;
        a counter unit which starts a count operation from a time when the position signal zero-crosses, at the time of startup of the single phase brushless DC motor;
        an output waveform generation unit which generates a modulation signal having a voltage amplitude that is constant in the first time period and is decreased as time elapses in the second time period, based on the speed instruction signal and a count value of the counter unit; and
        a PWM generation unit which generates the PWM signal having the pulse width that is constant in the first time period and is narrowed as time elapses in the second time period, based on the modulation signal.

2. The motor driving circuit according to claim 1, wherein the controller widens the pulse width of the PWM signal as time elapses in a third time period which starts after the position detection signal zero-crosses and lasts immediately before the first time period.

3. The motor driving circuit according to claim 1, wherein the controller prohibits outputting of the PWM signal to a side, to which the inverter circuit supplies the driving current next time, in a transition time period which starts immediately after the position detection signal zero-crosses.

4. The motor driving circuit according to claim 1, wherein the inverter circuit alternately generates a first voltage signal for enabling a current to flow from one end portion of the coil to the other end portion thereof and a second voltage signal for enabling a current to flow from the other end portion of the coil to the one end portion thereof each time the position detection signal zero-crosses, and
wherein each of the first and second voltage signals is the PWM signal having the pulse width that is constant in the first time period and is the PWM signal having the pulse width that is narrowed as time elapses in the second time period immediately after the first time period.

5. The motor driving circuit according to claim 1, wherein when the single phase brushless DC motor reaches a predetermined number of rotations after the single phase brushless DC motor starts, the controller prohibits the supply of the driving current to the coil for a predetermined time period and then generates the a steady PWM signal based on the position detection signal.

6. The motor driving circuit according to claim 1, wherein at the time of startup of the single phase brushless DC motor, the controller provides a predetermined standby time period during which the driving voltage is not supplied to the coil and then provides the first time period which starts after the standby time period and lasts until the position detection signal zero-crosses.

* * * * *